United States Patent Office 3,093,953
Patented June 18, 1963

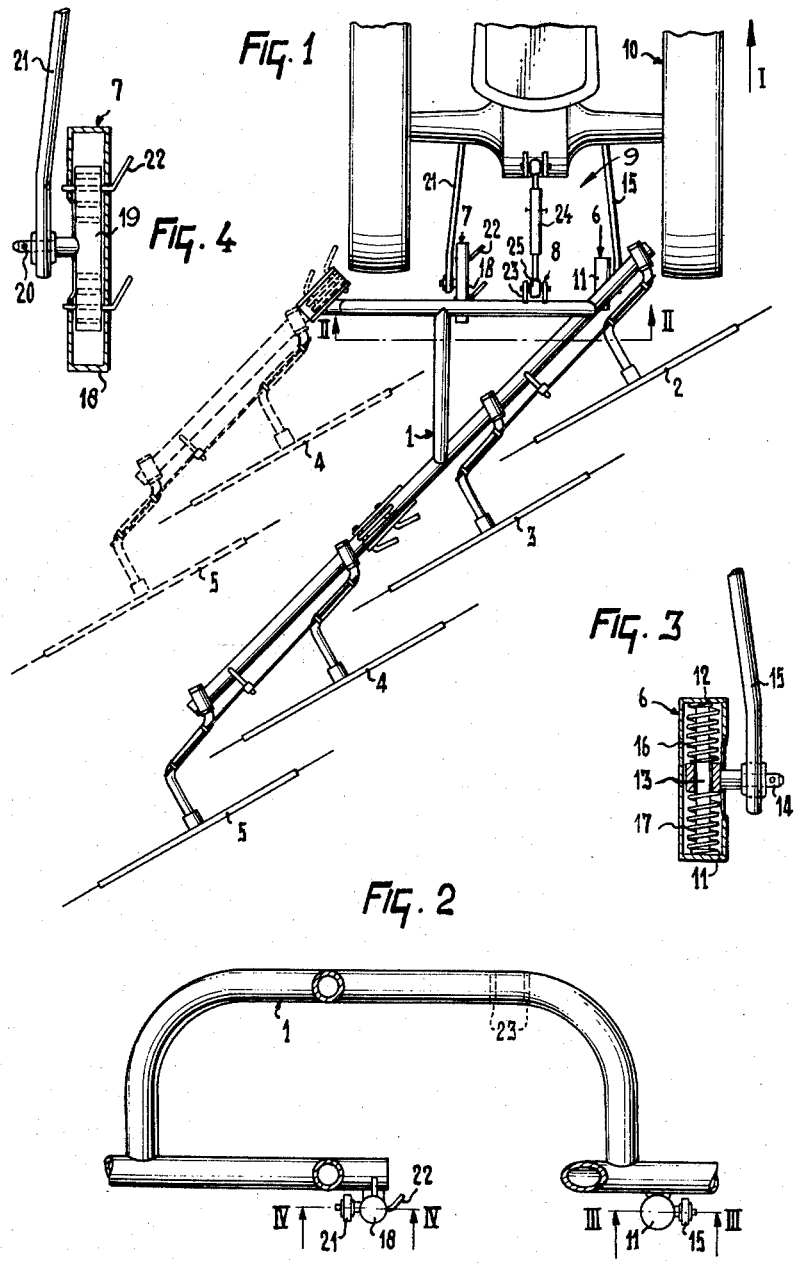

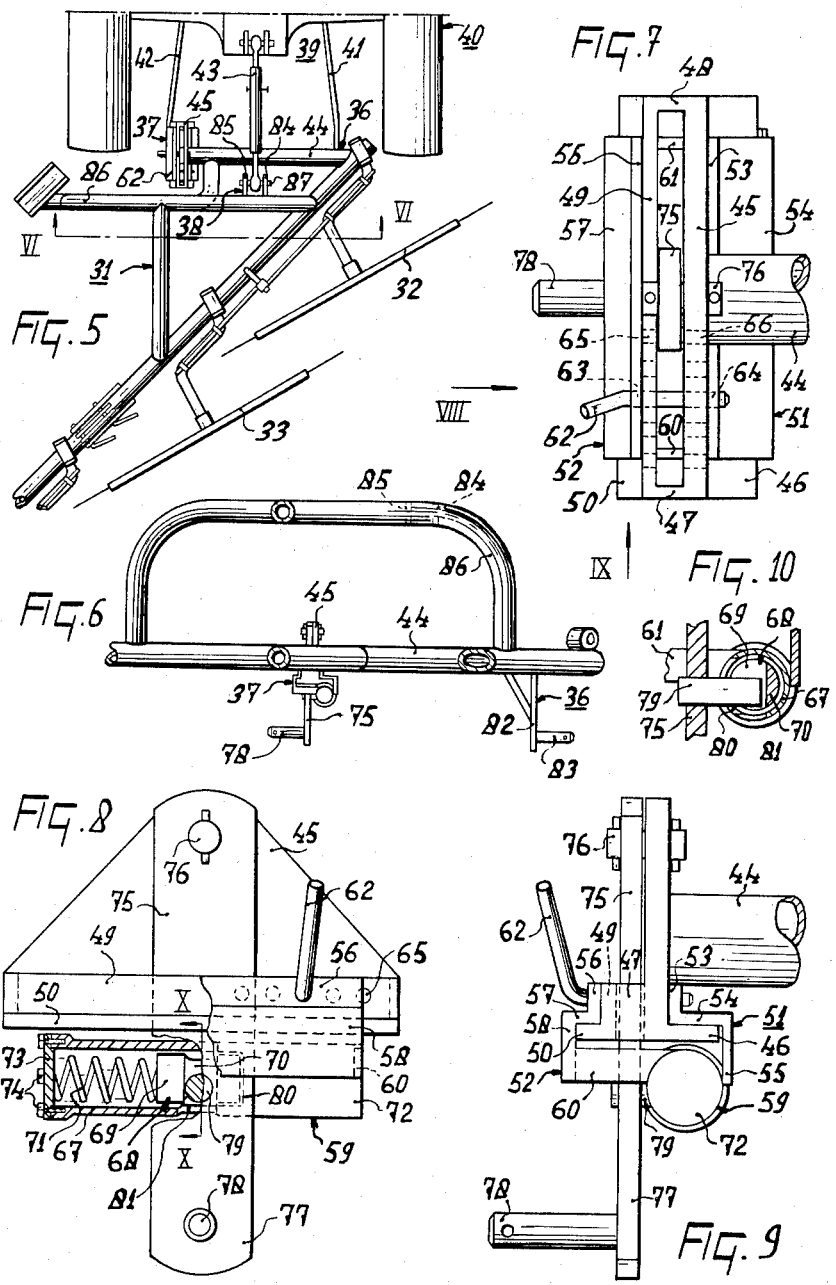

3,093,953
DEVICE FOR THE LATERAL DISPLACEMENT OF MATERIAL LYING ON THE GROUND
Cornelis van der Lely, Zug, Switzerland, assignor to Patent Concern N.V., Willemstad, Curacao, Netherlands Antilles, a limited-liability company of the Netherlands
Filed Nov. 27, 1959, Ser. No. 855,594
Claims priority, application Netherlands Dec. 3, 1958
15 Claims. (Cl. 56—377)

The invention relates to a device for the lateral displacement of material lying on the ground, comprising a frame and a plurality of rake members, the frame being adapted to be connected to a tractor or a similar vehicle by means of at least two fastening members.

The invention has for its object to connect this device to a tractor in a manner such that the irregularities in steering during travel are transferred as little as possible to the device for the lateral displacement of material lying on the ground. In accordance with the invention this is achieved by constructing the fastening members so that during operation the device is capable of deviating resiliently in a horizontal direction with respect to the tractor.

According to an advantageous embodiment of the invention a first fastening member consists of a part connected with the tractor and a part connected with the frame, these parts being movable relatively to each other and co-operating with at least one resilient element, which tends to hold the two parts in a given relative position.

The fastening between the fastening member and the tractor is such, in accordance with a further embodiment, that the device is capable of turning about a point near this member.

According to a further aspect of the device according to the invention a fastening member may consist of a tube connected with the frame and a shaft, connected with the tractor and slidable in the said tube, which shaft can be fixed in at least two positions relative to the tube, so that the position of the device with respect to the tractor can be varied.

The invention will be described more fully with reference to an advantageous embodiment as illustrated in the accompanying drawing in which:

FIG. 1 is a plan view of a device according to one embodiment of the invention;

FIG. 2 is a sectional view of the device shown in FIG. 1 taken on line II—II of this figure;

FIG. 3 is, on an enlarged scale, a sectional view along line III—III of FIG. 2 of a detail of the device shown in FIGS. 1 and 2;

FIG. 4 is, on an enlarged scale, a sectional view along line IV—IV of FIG. 2 of a further detail of the device shown in FIG. 1;

FIG. 5 is a plan view of part of another device according to the invention, coupled with the lifting device of a tractor;

FIG. 6 shows, on an enlarged scale, a sectional view taken along line VI—VI of FIG. 5;

FIG. 7 shows, on an enlarged scale, a plan view of a fastening member by which the device is coupled with a tractor;

FIG. 8 is an elevational view taken in the direction of arrow VIII in FIG. 7, with parts broken away and shown in section;

FIG. 9 is an elevation of the fastening member taken in the direction of arrow IX of FIG. 7;

FIG. 10 is a sectional view of the resilient mechanism taken along section line X—X of FIG. 8.

The device shown in FIGS. 1 and 2 comprises a frame 1, on which four rake wheels 2, 3, 4 and 5 are arranged by means of cranks, these wheels being capable of laterally displacing material lying on the ground. The frame is furthermore provided with three fastening members 6, 7 and 8, by means of which the device can be fastened to the three-point lifting device 9 of a tractor 10. The lifting device comprises two lower lever arms 15 and 21 (FIGS. 3 and 4) and an upper lever arm 24.

The first fastening member 6 comprises a cylinder 11, which is secured to the frame of the device. In this cylinder is arranged a shaft or guide 12, over which a piston-like body or part 13 is slidable. The piston-like body 13 is connected by means of a gudgeon 14, slightly pivotably, with the lower arm 15 of the lifting device 9. On either side of the body 13 resilient elements consisting of pressure springs 16 and 17 are arranged around the shaft 12, which elements co-operate with the body 13, connected with the tractor, and with the part 11 connected with the frame 1. The resilient elements tend to hold the two parts in a given relative position.

In the embodiment shown, in the state of equilibrium, the member 13 is located approximately in the center of the cylinder 11.

The second fastening member 7 consists of a tube 18, which is connected with the frame of the device. In this tube is arranged a shaft 19, which is pivotably connected by means of a gudgeon 20, at right angles to this shaft, with the lower lever arm 21 of the lifting device 9. The shaft 19, which is slidable in the tube 18, can be fixed in various positions relative to the tube by means of two pins 22.

The fastening member 8 comprises two strips 23, arranged on the frame; the upper lever arm 24 of the lifting device 9 can be arranged between these strips and be connected to the same by means of a shaft 25, which extends through holes provided in the strips 23.

When the tractor moves in the direction I, the rake wheels 2 to 5 of the device, which can be moved into two working positions, will displace the crop laterally. In the working position in which the rake wheels 2 to 5 are arranged in one row, as is shown in full lines, the device constitutes a side-delivery rake, whereas in a second working position, in which the rake wheels 4 and 5 are arranged on the frame in a position as shown in broken lines, the device constitutes a swath turner.

When the tractor moves, unevennesses of the ground or other conditions will involve irregularities in steering, which are particularly due to the varying positions of the front wheels of the tractor relative thereto or to slipping. In order to prevent the device from following these irregularities in steering, so that the device would move to and fro in a horizontal plane, the fastening member 6 is constructed in the manner described above. The device is thus capable of moving relatively to the tractor near the fastening member in the direction of travel. During this movement in the horizontal plane the member 13 slides along the shaft 12 in the cylinder 11, so that the springs 16 or 17 will be compressed.

In order to perform these movements the fastening member 8 is constructed so that the shaft 25 has a certain amount of play in the holes of the strips 23, the gudgeon 20 being capable of pivoting in the hole of the lever 21, so that the device turns about a vertical axis near the fastening member 8.

When the tractor performs movements owing to irregularities in steering, the rake wheels 2, 3, 4 and 5, which are in contact with the ground and have a quantity of material in front of them, will resist the performance of a similar movement. If they were to follow the movements of the tractor due to irergularities in steering, they would have to perform additional movements on the ground and in certain cases they had to displace laterally the quantity of material lying in front of them in a direction at right angles to the rake wheels.

When the tractor performs movements due to irregularities in steering, the device will deviate relatively to the tractor so that either the spring 16 or the spring 17 is compressed. Before the tension in one of these springs attains a value such that the device would follow the tractor movement, the deviation of the tractor from the desired direction of travel may have been restored, so that the movement performed by the tractor is not followed by the device. The irregularities in steering of the tractor are thus compensated by the fastening member 6 and are not transferred to the device or are transferred only to a slight extent. Thus during travel the row of rake wheels will maintain the same position with respect to the direction of travel I, so that a clean straight swath can be formed by the device.

If the device could not move in a horizontal plane with respect to the tractor, the irregularities in steering would be followed by the rake wheels. Particularly the hindmost rake wheel 5, which is spaced apart from the tractor by a greater distance than the other rake wheels, would deviate over large distances in a horizontal plane, mainly at right angles to the direction of travel. Owing to these movements an irregular swath would be formed, which may be a source of trouble in further working of the material. The oblique position of the rake wheels with respect to the direction of travel I may be varied by displacing the shaft 19 in the tube 18, whereby the device swings in a horizontal plane relatively to the tractor and turns about a vertical axis near the fastening member 6. By displacing the device in this manner, the working width of the device may be varied, which may provide advantages particularly in the working position of the side-delivery rake.

The device of the embodiment shown in FIGURES 5–10 comprises a frame 31, which is provided with four rake wheels, of which two, i.e. the rake wheels 32 and 33, are shown. The device is coupled with the lifting device 39 of a tractor 40 by means of three fastening members 36, 37 and 38. The fastening members 36 and 37 are coupled with the lower lever arms 41 and 42 and the fastening member 38 is coupled with the topmost lever arm 43 of the lifting device 39. The fastening member 37 is secured to the frame beam 44 and has a plate 45 welded thereto. The plate 45 is arranged vertically and has a horizontal rim 46 (FIG. 7), located beneath the beam 44. The plate 45 is secured with the aid of two strips 47 and 48 to a plate 49, which is provided at the lower end with a horizontal rim 50.

The plates 45 and 49 with the horizontal rims 46 and 50 constitute a guide for supports 51 and 52, which are adapted to slide over the guide.

The support 51 has an upright side 53, which engages the plate 45, a horizontal part 54, which bears on the rim 46, and a side 55, which extends downwards along the part 46. The support 52 has an upright side 56, which engages the plate 49, a horizontal part 57, which bears on the rim 50, and a vertical side 58, which extends downwards along the rim 50. To the lower end of the side 55 is secured a resilient mechanism 59, which is connected by means of two strips 60 and 61 with the side 58 of the support 52. In this manner the supports 51 and 52 and the resilient mechanism 59 form a unit which bears on the rims 46 and 50.

The supports 51 and 52 with the resilient mechanism 59 are adapted to slide over the guides 46 and 50 and be fixed in a given position by means of a locking pin 62. This pin 62 can be inserted into holes 63 and 64, provided in the sides 53 and 56 of the supports 51 and 52, and into one of the holes 65 and one of the holes 66 provided in the plate 49 and the plate 45 respectively.

The resilient mechanism 59 comprises a cylindrical housing 67 (FIG. 8), which is secured to the support 51. In the cylindrical housing 67, which constitutes a first part of the resilient mechanism, is slidable a second part 68. This second part 68 consists of two piston-shaped blocks 69, spaced apart from each other by a given distance; (see FIGS. 8 and 10). The blocks 69 are connected with each other by a strip 70. On each side of the part 68 is arranged a resilient element in the form of a pressure spring 71, of which only one is shown in FIG. 8. The spring which is not shown in the drawing extends between a block 69 and the bottom 72 of the cylindrical housing 67, whereas the other spring 71 is located between the block 69 and the lid 73, which is secured to the housing 67 by means of bolts 74.

With the plate 45 is connected a lever 75 by means of a horizontal shaft 76, which is secured to the top end of the plate 45 and is located on a higher level than the frame beam 44. At the lower end 77 the lever 75 is provided with a pin 78, by which the fastening member can be coupled with the lower lever arm 42 of the lifting device 39 of the tractor.

Between the shaft 76 and the lower end 77 the lever 75 is provided with a pin 79, which extends through a hole 80 in the wall of the housing 67 and is located between the piston shaped blocks 69 (see FIGS. 8 and 10).

In order to mount the lever 75 and to arrange the pin 79 between the blocks 69 the cylindrical housing 67 is provided at the bottom with a hole 81.

The fastening member 36 consists of a strip 82, which extends downwards from the beam 44 and is provided at the lower end with a pin 83, which can be coupled with the lower lever arm 41 of the lifting device 39.

The fastening member 38 consists of two strips 84 and 85, which are secured to a beam 86 of the frame 31 and can be coupled by means of a pin 87 with the upper lever arm 43 of the lifting device 39.

When the device moves on by means of the tractor 40, it will be capable of deviating resiliently in a horizontal direction with respect to the tractor. This deviation is allowed, since the pins 83 and 87 of the fastening members 36 and 38 are coupled with the lever arms 41 and 43 with a certain amount of play, whereas the pin 78 is capable of moving with respect to the device owing to a pivotal movement of the lever 75 about the shaft 76.

When the lever 75 moves, also the pin 79 and the part 68 will move simultaneously. The springs 71, with which the housing 67 and the part 68 co-operate will tend to hold the part 68 in the centre of the housing 67 so that the deviation of the device is resiliently acted upon. During the resilient deviation the cylindrical housing 67 and the part 68 will move relatively to each other, whilst the cylindrical housing 67 remains stationary with respect to the frame of the device and the part 68, owing to the coupling with the tractor 40 with the aid of the lever 75 does not follow the movements of the device. By coupling the tractor 40 not directly, but via the lever 75 with the resilient mechanism 59, the latter is capable of absorbing favourably the forces exerted thereon.

The movement of the pin 79 with respect to the housing 62 is possible owing to the size of the hole 80.

The opening formed by the plates 45 and 49 and the strips 47 and 48 constitutes for the lever 75 a guide path extending in the direction of travel and located near the resilient mechanism 59 and supporting locally the lever.

The position of the device for the lateral displacement of crop lying on the ground may be varied with respect to the tractor by displacing the resilient mechanism 59 with respect to the frame of the device. This changeover may be carried out by displacing the supports 51 and 52 with the resilient mechanism 59 over the guide formed by the plates 45 and 49 with their rims 46 and 50. The mechanism 59 is fixed in a different position by inserting the locking pin 62 into further holes 65 and 66. During this displacement the lever 75 will turn about the shaft 76 and occupy a different position, since it is connected with the part 68 by means of the pin 79, which part is held in a central position by the spring 71 with respect to the cylindrical housing 67.

The fastening member 37 is secured to the frame beam 44 so that the resilient mechanism 59 and the guide thereof extend parallel to the direction of travel of the device, whilst the pin 78 is movable with respect to the frame 31 of the device in a direction which coincides with the direction of travel of the tractor. Thus during the position variation with respect to the tractor the frame will turn in a horizontal direction. The resilient deviation of the device will also take place in a horizontal direction, since the resilient mechanism 59 extends in a horizontal direction. During the position variation of the device with respect to the tractor, the device will turn relatively to the tractor about a point located near the fastening member 36.

What I claim is:

1. A device adapted for being connected to a traction vehicle for the lateral displacement of material lying on the ground, said device comprising a frame, a plurality of rake members on said frame, and at least two laterally spaced fastening means on said frame and connecting the same to said vehicle, at least one of said fastening means including resilient means connected to and permitting the frame to deviate resiliently relatively to the said vehicle in a substantially horizontal plane.

2. A device as claimed in claim 1, wherein one of the fastening means consists of a part connected with the vehicle and a part connected with the frame, and a resilient element, said parts being operatively associated and movable relative to each other and being further operatively associated with said resilient element, which tends to hold the two parts in a given relative position.

3. A device as claimed in claim 2, comprising a guide connected with said frame and wherein the part connected with the vehicle is movable along said guide, and further comprising on each side of this part a pressure spring constituting said resilient element.

4. A device as claimed in claim 3, wherein the guide includes a shaft, a cylinder and a piston-like body, said shaft being arranged in said cylinder, said piston-like body being connected with the vehicle and being slidable along said shaft.

5. A device as claimed in claim 4, wherein the second of said fastening means enables a pivoting of the frame adjacent the second said means.

6. A device as claimed in claim 1, wherein one of the fastening means includes a tube connected with the frame and a shaft connected with the vehicle and slidable in the said tube and means whereby the shaft can be fixed in at least two positions relative to the tube.

7. A device as claimed in claim 1, wherein the resilient element includes means whereby it is displaceable and fixable in at least two positions with respect to the frame and vehicle so that the position of the device with respect to the vehicle can be varied.

8. A device as claimed in claim 7, comprising and wherein the resilient means is slidably arranged on a guide of the frame.

9. A device as claimed in claim 8, wherein the guide extends in at least substantially horizontal direction.

10. A device as claimed in claim 9, wherein the guide extends at least substantially in the direction of travel of the device.

11. A device as claimed in claim 1, comprising and wherein the resilient means is connected with the vehicle by a lever.

12. A device as claimed in claim 11, wherein the lever is hinged to the frame of the device, the tractor being connected by means of said lever with the resilient element.

13. A device as claimed in claim 12, wherein the lever is hinged to the frame so as to be pivotable about a substantially horizontal axis.

14. A device as claimed in claim 13, wherein the connection of the lever with one of the parts of the resilient mechanism is located between the pivotal axis of the lever and the coupling of the lever with the tractor.

15. A device as claimed in claim 14, comprising and wherein the lever travels along a guide rigidly secured to the frame.

References Cited in the file of this patent

UNITED STATES PATENTS

| | | |
|---|---|---|
| 280,902 | Blood | July 10, 1883 |
| 2,796,149 | Wallin | June 18, 1957 |
| 2,896,392 | van der Lely et al. | July 28, 1959 |
| 2,925,700 | Plant | Feb. 23, 1960 |

FOREIGN PATENTS

| | | |
|---|---|---|
| 535,598 | Italy | Nov. 15, 1955 |
| 1,144,202 | France | Apr. 23, 1957 |